Patented Aug. 23, 1949

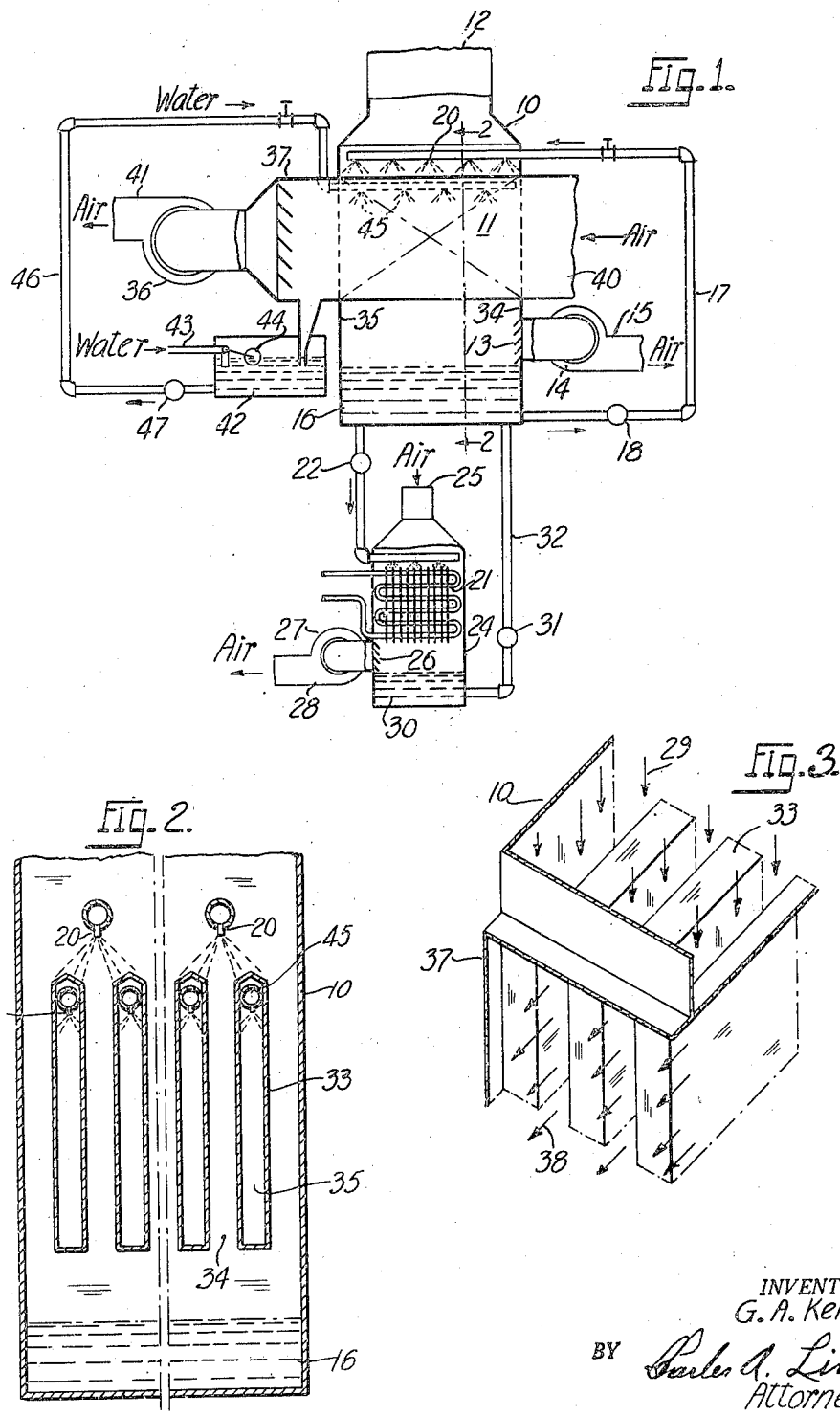

2,479,936

UNITED STATES PATENT OFFICE 2,479,936

AIR CONDITIONING APPARATUS

Gilbert A. Kelley, Toledo, Ohio, assignor to Surface Combustion Corporation, Toledo, Ohio, a corporation of Ohio Application December 21, 1946, Serial No. 717,664

2 Claims. (Cl. 62—139)

The invention relates to apparatus for conditioning air by means requiring the use of a hygroscopic solution, such as a solution of lithium chloride, for abstracting moisture from the air. Because the absorption of moisture by a hygroscopic solution is accompanied by a rise in temperature of the solution, it is customary to provide in the dehumidifying zone a heat exchanger through which a stream of cold water may be passed and over which the solution may spread out in the form of films for exposure to the air which is to be dehumidified. To conserve water supplies it is customary to recool the water for recirculation. The present invention has for its general object to provide improvement in ways and means for utilizing water for abstracting heat from the solution through a heat conducting wall.

For a consideration of what I consider to be novel and my invention, attention is directed to the following specification and the claims appended thereto.

In the accompanying drawing forming part of this specification,

Fig. 1 is a diagrammatic representation of an air conditioning apparatus embodying the present invention.

Fig. 2 illustrates the nature of the improvement embodied in Fig. 1, the view being a vertical transverse section on line 2—2 of Fig. 1 with an intermediate duplicate portion omitted as indicated by the space between the vertical broken lines in Fig. 2.

Fig. 3 is a fragmentary isometric view of enough of the apparatus shown in Fig. 2 to facilitate a ready understanding of the nature of the improvement.

The air conditioning apparatus as a whole comprises an upright casing 10 which defines a passage for the air to be dehumidified. Intermediate the ends of said casing, there is a dehumidifying zone 11 formed by the apparatus shown in Fig. 2, this apparatus providing among other things an extended surface along which hygroscopic solution is free to spread out for exposure to the air flowing through the casing, the solution being applied to said surface in any preferred way as presently explained. The air to be conditioned enters the casing 10 through a top inlet 12. After having passed through the dehumidifying zone 11, the air leaves the casing through a side outlet 13. A centrifugal blower 14 whose suction side is connected with the air outlet 13 causes the air to enter and flow through the casing. A duct 15 connects with the pressure side of the blower for conducting the dehumidified air to the place of use. At the bottom of the casing 10 there is a tank 16 for a body of hygroscopic solution. Solution from this tank is pumped through a pipe line 17 having a pump 18 to a spray means 20 in the upper part of the casing 10 so that the solution may be applied to the extended surface in the dehumidifying zone 11 to expose the solution to the air flowing through the casing, it being understood that the solution flows by gravity from the spray means over said extended surface and thence to the tank 16 for recirculation after being reconcentrated as presently explained.

To maintain the solution in the tank 16 at a predetermined concentration, a portion thereof is constantly withdrawn for concentration and then returned to the main body of the solution in the tank. The concentrator may comprise an internally heated radiator 21 over which solution drawn from the tank 16 by a pump 22 is caused to flow whereby to heat the solution to a sufficiently elevated temperature to drive off moisture from the solution. The radiator is positioned in an air casing 24 so that a current of air through the casing will carry away the water vapor from the solution. The air enters the casing through a top inlet 25 and leaves through a side outlet 26. A centrifugal blower 27 whose suction side connects with the outlet 26 is the means which causes the air to flow through the casing. A duct 28 at the pressure side of the blower conducts the mixture of air and water vapor to waste as to the outside atmosphere. At the bottom of the casing 24 is a tank 30 whereinto the solution drips from the radiator 21. The solution is pumped from the tank 30 to the tank 16 by a pump 31 in a return line 32.

In the present invention, the means in the dehumidifying zone 11 for bringing the hygroscopic solution and the air to be dehumidified into intimate contact with each other comprises the exterior surface of a bank of relatively tall and laterally narrow tunnels 33 which extend through and beyond the dehumidifying zone 11 in a horizontal direction, the tunnels being arranged in spaced relation to provide air passages 34 therebetween for the air to be dehumidified. In Fig. 3, the vertical arrows 29 indicate the current of air flowing through the casing 10. As will be readily understood from Fig. 2, the hygroscopic solution from the spray means 20 spreads over the exterior surface of the tunnels and eventually drips into the tank 16. The passage through the tunnels is indicated at 35.

As previously indicated, the absorption of moisture by the hygroscopic solution is accompanied by a rise in temperature of the solution with consequent decrease in its moisture-absorbing capacity and heretofore it has been common practice to remove this heat of moisture absorption by indirect heat exchange with cold water flowing through a heat exchanger whose exterior provides an extended surface for films of the hygroscopic solution, it being apparent that this method of heat exchange presupposes an exterior source of supply of cold water. In the present invention, a high velocity current of air from the outside atmosphere is passed through the tunnel-passages 35 for a purpose presently appearing. This current of air through the tunnels is produced by a centrifugal blower 36 whose suction side is connected by a duct 37 with one end of the bank of tunnels. In Fig. 3, the horizontal arrows 38 indicate the current of air as coming from the tunnel passages 35 on its way to the suction side of the blower 36. A duct 40 conducts the air from the outside atmosphere to the inlet side of the bank of tunnels and a duct 41 extending from the pressure side of the blower 36 conducts the air to waste.

In the present invention, films of water are applied to the inner wall surface of the tunnels 33 to the end that the current of air through the tunnels may cool the water by partial evaporation thereof whereby to maintain the films of hygroscopic solution on the exterior wall surface of the tunnel relatively cool by transfer of heat from said solution to the films of water by way of the tunnel walls as will now be readily understood. The unevaporated water drains into a tank 42 to which make-up water is added by a pipe 43 leading from a source of supply and having a throttling valve controlled by a float 44 in the tank whereby to maintain a constant level of water in the tank. The water from the tank 42 is piped to a spray means 45 in each tunnel through a pipe line 46 having a pump 47 for that purpose.

From the foregoing explanation it will be seen that the present invention provides a relatively simple and practical method and apparatus for maintaining the films of hygroscopic solution in the dehumidifying zone relatively cool without an excessive use of cooling water and without the necessity of providing means outside of the casing 10 for the evaporative cooling of the water with the result that the air conditioning apparatus as a whole is a relatively simple and compact affair well adapted for use in homes where space is at a premium.

What is claimed as new is:

1. Apparatus for conditioning air by the use of a hygroscopic solution comprising, in combination, means for producing a current of the air to be conditioned, a casing having a zone through which the air flows, a source of supply of said hygroscopic solution, a plurality of laterally spaced bodies collectively forming in said zone an extended contact surface for said air and solution, means for wetting said contact surface with running films of said solution, each of said bodies comprising a relatively tall and laterally narrow tunnel which traverses said casing from side to side and thereby provides a closed passageway through said zone crosswise thereof, means for wetting the inside surface of the several tunnels with running films of water, and means for producing a current of air through said tunnels to abstract heat from the running films of water by partial evaporation thereof whereby the films of water are maintained sufficiently cool to absorb heat from the films of hygroscopic solution through the walls of the tunnels.

2. Apparatus for conditioning air by the use of a hygroscopic solution comprising, in combination, means for producing a current of the air to be conditioned, a casing having a zone through which the air flows, a source of supply of said hygroscopic solution, a plurality of laterally spaced bodies collectively forming in said zone an extended contact surface for said air and solution, means for wetting said contact surface with running films of said solution, each of said bodies comprising the exterior walls of a relatively tall and laterally narrow tunnel which provides a closed passageway through said zone crosswise thereof, means for wetting the inside surface of the several tunnels with running films of water, and means for producing a current of air through the several tunnels to abstract heat from the running films of water by partial evaporation thereof whereby the films of water are maintained sufficiently cool to absorb heat from the films of hygroscopic solution through the walls of the tunnels.

GILBERT A. KELLEY.

REFERENCES CITED

The following references are of record in the file of this patent:

UNITED STATES PATENTS

| Number | Name | Date |
|---|---|---|
| 2,192,126 | Downs | Feb. 27, 1940 |
| 2,321,115 | Thomas | June 8, 1943 |